United States Patent [19]

Kanda et al.

[11] Patent Number: 4,777,213

[45] Date of Patent: Oct. 11, 1988

[54] MICROPARTICLES HAVING CROSSLINKING REACTION PROMOTOR FUNCTION AND METHOD OF USE

[75] Inventors: Kazunori Kanda, Yao; Shinichi Ishikura, Tsuzuki; Keizou Ishii, Ashiya; Akio Kashihara, Hirakata, all of Japan

[73] Assignee: Nippon Paint Co., Ltd., Osaka, Japan

[21] Appl. No.: 21,000

[22] Filed: Mar. 2, 1987

Related U.S. Application Data

[63] Continuation of Ser. No. 745,983, Jun. 18, 1985, abandoned.

[30] Foreign Application Priority Data

Jun. 18, 1984 [JP]  Japan ................................ 59-126225

[51] Int. Cl.$^4$ .............................................. C08L 63/00
[52] U.S. Cl. ...................................... 525/114; 522/35; 522/37; 522/40; 522/43; 522/44; 522/46; 522/48; 522/69; 523/404; 523/414; 523/416; 524/507; 524/512; 524/901; 524/902; 525/110; 525/111; 525/113; 525/108; 525/155; 525/157; 525/162

[58] Field of Search ................ 526/286; 525/518, 110, 525/111, 113, 114, 108, 155, 157, 162; 522/35, 37, 40, 43, 44, 46, 48, 69; 523/404, 414, 416

[56] References Cited

U.S. PATENT DOCUMENTS

| | | | |
|---|---|---|---|
| 4,340,511 | 7/1982 | Backhouse et al. | 524/504 |
| 4,427,820 | 1/1984 | Backhouse et al. | 524/504 |
| 4,468,493 | 8/1984 | Ishikura et al. | 525/123 |
| 4,569,966 | 2/1986 | Piccirilli et al. | 524/589 |

*Primary Examiner*—Theodore E. Pertilla
*Attorney, Agent, or Firm*—Millen & White

[57] ABSTRACT

Promoters for a crosslinking reaction involved in the curing of a system comprising crosslinkable polymers are bound to polymeric microparticles having a diameter of about 0.01 to 6 microns prepared by polymerizing a mixture of ethylenically unsaturated monomers. The microparticles carrying the crosslinking reaction promoter may be incorporated to coating compositions, printing inks, sealants, adhesives and other polymeric products in place of conventional crosslinking reaction promoters.

12 Claims, No Drawings

MICROPARTICLES HAVING CROSSLINKING REACTION PROMOTOR FUNCTION AND METHOD OF USE

This a continuation, of application Ser. No. 745,983 filed June 18, 1985, now abandoned.

BACKGROUND OF THE INVENTION

The present invention relates to polymeric microparticles capable of promoting the crosslinking reaction of a crosslinkable polymer used in, for example, coating compositions, printing inks, sealants, adhesives and the like.

As is well-known, melamine-acrylic coating compositions are cured into a rigid coating film through the crosslinking reaction of hydroxyl group-containing acrylic polymer with melamine resin at an elevated temperature. Usually a catalytic amount of proton donors is added to the reaction system to promote the crosslinking reaction. Otherwise the reaction will not be completed within a reasonable length of time.

Other examples of such agents which are capable of promoting the crosslinking reaction of crosslinkable polymers include acid catalysts and tertiary amines to be incorporated to epoxy resins, organic tin compounds and tertiary amines used in polyisocyanate-containing systems, organic cobalt salts used in unsaturated polyesters, dryers used in drying oils and other oxidation-polymerizable resins, and photosensitizers used in various photocurable compositions.

The term "crosslinking reaction" as used herein means the reaction in which starting monomers, oligomers or polymers are reacted with each other or with a crosslinking agent to increase their molecular weights by setting up chemical links between the molecular chains of the resulting polymers.

Crosslinking reaction promoters are used not only in coating compositions but also in printing inks, adhesives, sealants and other polymeric products. Although its presence is practically imperative, the crosslinking reaction promoter is a separate component for the polymer to be crosslinked and is often incompatible with the polymer in a system containing the same. Thus, it is often difficult to disperse the crosslinking reaction promoter uniformly in the polymer system for ensuring uniform crosslinking. Also, the polymer system containing the crosslinking reaction promoter generally tends to be unstable upon storage.

The crosslinking reaction promoter usually remains as such in the cured polymer after having performed its function and is susceptible to migration and leaching outside the cured polymer, thereby causing various disadvantages.

It is, therefore, a principal object of the present invention to provide a new form of crosslinking reaction promoters which may avoid or minimize various disadvantages associated with conventional crosslinking reaction promoters.

It is another object of the present invention to provide a method for curing a crosslinkable polymer through a crosslinking reaction into a rigid state in which the crosslinking reaction promoter is immobilized.

Other objects and advantages of the present invention will become apparent as the description proceeds.

BRIEF DESCRIPTION OF THE INVENTION

According to the present invention, these and other objects may be accomplished by providing microparticles having bound therewith a crosslinking reaction promoter and having a diameter of about 0.01 to 6 microns prepared by polymerizing ethylenically unsaturated monomers.

The crosslinking reaction promoter may be proton donors, electron donors, ligand donors, agents capable of decomposing peroxide free radical initiators, dryers or photosensitizers.

The crosslinking reaction promoter may be bound to the microparticles using one of the following techniques: (a) impregnating microparticles with the promoter, (b) admixing the promoter with monomers from which microparticles are prepared, and (c) introducing ethylenic unsaturation function to the promoter molecule and copolymerizing resulting promoter monomer with monomers from which microparticles are prepared.

Preferably, at least a portion of monomers from which microparticles are prepared contains a monomer having at least two polymerizable sites per molecule or a combination of two monomers having mutually reactive groups for internally crosslinking the microparticles so that the resulting microparticles are insoluble in conventional organic solvents. Insoluble microparticles are incorporated to advantages to coating compositions containing organic solvents.

The microparticles themselves may form a part of film-forming components while performing the crosslinking reaction promoter function. The microparticles are retained in an immobilized state in the cured film after having performed the promoter function. Thus, the degradation of coating films due to the migration and leaching of crosslinking reaction promoters may be avoided or minimized.

The microparticles may be uniformly and stably dispersed in solvent type, aqueous type and powder type coating compositions with great ease. Compositions containing the microparticles are very stable upon storage for a long period of time.

The present invention also provides a method of curing a crosslinkable polymer through a self-crosslinking reaction or a crosslinking reaction with a crosslinking agent. The method is characterized by adding to the reaction system containing said crosslinkable polymer a catalytic amount of microparticles having bound therewith a crosslinking reaction promoter and having a diameter of about 0.01 to 6 microns prepared by polymerizing ethylenically unsaturated monomers.

DETAILED DISCUSSION

The nature of particular crosslinking reaction promoter and the method for binding thereof to the microparticles of the present invention may vary depending upon the nature of particular crosslinkable polymer, and thus the type of particular crosslinking reaction. Typical examples thereof are given below.

System containing aminoplast resins

Alkyd resins and acrylic resins containing hydroxyl and/or carboxyl groups may be cured through a crosslinking reaction with aminoplast resins such as melamine resin. Aminoplast resins themselves are also susceptible to a selfcondensation reaction. These reactions may be promoted by an —$SO_3H$ or —$PO_4H_2$ group bearing proton donor. The microparticles of the present invention may carry such proton donor function as a separate component or incorporated into the polymer backbone constituting the microparticles.

Specifically, proton donors may be introduced into the microparticles during their polymerization process by incorporating an amount of a monomer having one of the above described acid groups to the starting monomer mixture, or employing an oligomer and/or surfactant having said acid group, or employing an initiator capable of generating said acid group upon decomposition.

Alternatively, proton donors may be bound subsequently by impregnating the microparticles with a proton donating substance. Examples of such separate proton donors include boric acid, phosphoric acid, acid sulfates, halosulfonic acids, sulfonyl halides, hydrogen chloride, ammonium phosphate, polyphosphoric acid, acid addition salts of hexamethylenetetramine, phthalic acid, oxalic acid, high molecular weight-polyalkylarenepolysulfonic acids disclosed in U.S. Pat. No. 3,979,478, amine arenesulfonates disclosed in U.S. Pat. No. 3,474,054, 2-dimethylamino-1-methyl-propanol p-toluenesulfonate disclosed in U.S. Pat. No. 3,293,324, arenesulfonic acid/oxa-azacyclopentane adducts disclosed in Japanese Patent Kokai (laid open) No. 54-153,397 and the like.

The impregnation may be carried out by dissolving the proton promoter substance in an organic solvent in which the proton donor is soluble but the microparticles are insoluble and soaking the microparticles in the solution until a desired pick up level is reached. Alternatively, the above solution may be added to a suspension of freshly prepared microparticles and then separating the microparticles from the suspension medium by a conventional technique such as filtration, spray drying, lyophilization and the like.

System containing epoxy resins

When epoxy resins are cured using a hardener having amino, carboxyl or hydroxyl groups, proton donor promoters are used. The microparticles may be imparted with the proton donor function in the same manner as previously described and the previously described microparticles carrying the proton donor function may also be used for this purpose.

When epoxy resins are cured using an acid anhydride hardener, an electron donating tertiary amine is used. Tertiary amines may be bound to the microparticles during their polymerization process by employing a monomer having a tertiary amino group as a portion of starting monomers, or employing a cationic initiator, or employing an oligomer and/ or surfactant. Alternatively, tertiary amines may be subsequently bound by the impregnation technique as described hereinbefore.

System containing polyisocyanates

When crosslinkable resins having active hydrogen atoms are crosslinked with a polyisocyanate, various metallic compounds or tertiary amines are employed as a ligand donor.

Metallic compounds may be bound to the microparticles either by emulsion polymerizing starting monomer mixture containing the metallic compound dissolved therein, or by subsequently impregnating the microparticles with the metallic compound.

Examples of metallic compounds include cobalt naphthenate, stannous chloride, tetra-n-butyltin, stannic chloride, tri-n-butyltin acetate, n-butyltin trichloride, trimethyltin hydroxide, dimethyltin dichloride, dibutyltin dilaurate, dibutyltin di-2-ethylhexanoate, tetra-2-ethylhexyl titanate, ferric chloride, ferric 2-ethylhexanoate, cobalt 2-ethylhexanoate, zinc naphthenate, antimony trichloride and the like.

The manner in which tertiary amines may be introduced has been already given.

System which cures through oxidation polymerization

A typical example of these systems is a system containing drying oils. As is well-known, various metallic compounds commonly referred to as "dryer" such as metallic soaps of Co, Mn, Fe, Zn, Al, Zr and the like are added to the system to catalyze the oxidation polymerization reaction of drying oils.

Microparticles carrying dryers may be prepared using techniques similar to those used for the preparation of microparticles carrying organic tin compounds.

System including unsaturated polyesters

Typically unsaturated polyester resins contain an unsaturated polyester, a crosslinking monomer and a radical initiator. The system additionally contains an agent for promoting the decomposition of the radical initiator. Examples thereof include organic cobalt salts such as cobalt naphthenate or cobalt octenate, amines and mercaptans.

Microparticles carrying these cobalt salts may be prepared by emulsion polymerizing starting monomers containing the cobalt salt dissolved therein, or by subsequently impregnating the microparticles with a solution of the cobalt salt.

Amines and mercaptans may be bound to the microparticles using a similar technique as used in binding tertiary amines.

Photocurable systems

Photocurable resin compositions typically comprise polymers and/or monomers having ethylenically unsaturated groups and a photosensitizer capable of generating free radicals through a photochemical reaction.

Examples of photosensitizers include benzophenone, benzoin, benzoin lower alkyl ethers, benzil, 2,2'-diethoxyacetophenone, 2-methylanthraquinone, 2-ethylanthraquinone and the like.

These photosensitizers may be bound to the microparticles by emulsion polymerizing monomers containing the photosensitizer dissolved therein, or by subsequently impregnating the microparticles with a solution of the photosensitizer.

Polymeric microparticles

Coating compositions containing polymeric microparticles and the preparation of such polymeric microparticles are known. For example, a coating composition comprising a film-forming polymer having a plurality of crosslinkable sites, a volatile organic liquid diluent capable of dissolving or dispersing the film-forming polymer, a crosslinking agent and polymeric microparticles stably dispersed in the coating composition has a advantage in that it may be applied on a substrated in a relatively large film thickness by a single coating operation.

Several methods are known for preparing the microparticles. One method includes the steps of emulsion polymerizing a mixture of ethylenically unsaturated monomers in an aqueous medium, and removing water from the emulsion by means of solvent substitution, azeotropic distillation, centrifugation, drying and the like. Although any conventional emulsifier may be used, ampho-ionic surfactants, polymerizable monomers, oligomers and polymers are preferable for stabilizing polymer particles during the polymerization process. Ampho-ionic group-containing alkyd resins disclosed in U.S. Pat. No. 4,322,324 and amphoteric amino sulfonate derivatives of epoxy resins disclosed in U.S. Pat. No. 4,379,872 may advantageously be employed.

Another method commonly referred to as the non-aqueous dispersion (NAD) method or precipitation polymerization method comprises polymerizing a mixture of ethylenically unsaturated monomers in a nonaqueous organic liquid such as aliphatic hydrocarbons or solvents having high solubility parameters in which the monomer mixture is soluble but the polymer is insoluble to form a non-aqueous dispersion of the polymeric microparticles.

The average size of microgel particles varies with the particular polymerization method. Thus, the emulsion polymerization and NAD methods are suitable for the range of 0.01 to 0.6 micron size, the precipitation polymerization method is suitable for the range of 0.2 to 2 micron size, and the suspension or bulk polymerization methods are suitable for the range of 1 to 6 micron size.

The polymeric microparticles of the present invention may be prepared by any known method except that the microparticles are imparted with the desired cross-linking reaction promoter function using various techniques as hereinbefore discussed.

The starting monomer mixture preferably contains, at least as a portion thereof, a monomer having at least two polymerizable sites per molecule or a combination of two monomers having mutually reactive groups to give microparticles which are insoluble in conventional organic solvents used in the coating industry. This is particularly advantageous when the microparticles are used in coating compositions containing such organic solvents, although the microparticles need not be internally crosslinked in other usages.

The polymeric microparticles of the present invention have a diameter of about 0.01 to 6 microns for retaining a good dispersibility, reactivity and stability in the crosslinkable polymer system.

At a given microparticle content in a coating system, the total surface area of the microparticles available for carrying the promoter substance is proportional to the reciprocal of the average radius of the microparticles. However, the efffect of the microparticles added to the coating system descreases with the decrease in the average radius. Accordingly, the particle size of microparticles may advantageously selected whether the promoter activity outweigh the filler effect or vice versa.

The crosslinked reaction promoted by the polymeric microparticles of the present invention takes place on the surface of the microparticles. Thus it is advantageous to localize the promoter substances near the exterior surface of microparticles as much as possible. This may be done by controlling the polymerization process of microparticles or by the selection of the method of binding the promoter substance to the microparticles. The localization of promoter substance may be determined by conventional surface analyzing methods such as ESCA, AES, FT-IR and the like.

Examples of ethylenically unsaturated comonomers used for the production of microparticles include methyl (meth)acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth) acrylate and the like. Two or more comonomers may be combined.

Cross-linking comonomers include a monomer having at least two ethylenically unsaturated bonds per molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris (hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris (hydroxymethyl)propane triacrylate, 1,1,1-tris(hydroxymethyl)propane dimethacrylate, 1,1,1-tris(hydroxymethyl)propane trimethacrylate, triallyl cyanurate, trialyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth)acrylate, hydroxybutyl (meth)acrylate, allyl alcohol or methallyl alcohol may be combined with isocyanato group-containing monomers such as vinyl isocyanate or isopropenyl isocyanate.

The promoter substance bound to the polymeric microparticles may promote not only the crosslinking reaction of a resin, but also reactions between the resin and the microparticles and between microparticles themselves. To this end, the microparticles may preferably have crosslinkable functional groups as previously discussed with reference to crosslinkable film-forming polymers.

When a further coating layer is formed over the coating containing the microparticles of the present invention to prepare a multilayer coating, the microparticles remaining near the exterior surface of the lower coating layer may advantageously promote the crosslinking reaction between the upper and lower layers. This greatly improves the adhesion between layers and other strength properties of the multilayer coating.

The polymeric promoter microparticles of the present invention may be used in a crosslinkable polymer system instead of adding conventional promoters which are not bound to the microparticles. The amount of microparticles to be added is such that the amount of active substance bound to the microparticles is at least equivalent to the amount of free promoter substance in which it is normally used.

When a single composition contains a plurality of crosslinkable polymer systems, mixtures of microparticles of two or more different types may be added. For example, a mixture of two or more types of microparticle carrying a photosensitizer and a heat curing promoter, respectively may be added to a system containing both a photocurable component and a heat-curable component.

The polymeric promoter microparticles of the present invention may be used in coating compositions of solvent type, aqueous type or powder type. The coating composition may be of a type which cures either at room temperature or at an elevated temperature.

The following examples illustrate the invention. All parts and percents are by weight unless otherwise indicated.

REFERENCE EXAMPLE 1

Preparation of Emulsifier

To a two liter flask having stirring means, a reflux condenser, temperature-control means, a nitrogen gas-introducing tube and decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azeotropic mixture with xylene. The temperature was raised to 190° C. over 2 hours and the reaction was continued with stirring until an acid number of 145 was reached.

The reaction product was cooled to 140° C. and 314 parts of CARDURA E-10(glycidyl versatate, Shell Chemical Company) was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

REFERENCE EXAMPLE 2

Preparation of Emulsifier

A flask used in Reference Example 1 was charged with 73.5 parts of sodium taurinate, 100 parts of ethylene glycol, and 200 parts of ethylene glycol monomethyl ether. The temperature was raised to 120° C. with stirring to give a uniform solution. To the solution was added with stirring a solution of 470 parts of EPIKOTE 1001 (Shell Chemical Company, bisphenol A diglycidyl ether epoxy resin having an epoxy equivalent of 470) in 400 parts of ethylene glycol monomethyl ether over 2 hours. The mixture was stirred at the same temperature for additional 20 hours to complete the reaction. The reaction mixture was treated as in Reference Example 1 to give 518 parts of modified epoxy resin. The resin had an acid number of 49.4 (KOH titration) and a sulfur content of 2.8% (X-ray fluorometry).

EXAMPLE 1

Microparticles Carrying Proton Donor

To a one liter flask having stirring means, cooling means and temperature-control means were added 300 parts of deionized water. The flask was purged with $N_2$ gas with stirring and water was heated to 80° C.

To the flask were added dropwise a pre-emulsified mixture consisting of 90 parts of styrene, 90 parts of methyl methacrylate, 120 parts of n-butyl acrylate, 6 parts of sodium alkylbenzenesulfonate and 150 parts of deionized water, and a solution of 6 parts of 2-acrylamide-2-methylpropanesulfonic acid and 6 parts of ammonium persulfate in 50 parts of deionized water over 2 hours with stirring. A dispersion of microparticles having a diameter of 0.8 microns and having a nonvolatile content of 37% was obtained.

EXAMPLE 2

Microparticles of carrying Proton Donor

A flask used in Example 1 was charged with 370 parts of deionized water, 40 parts of emulsifier prepared in Reference Example 1 and 3 parts of dimethylethanoiamine. The mixture was stirred at 80° C. to make a solution. To the solution was added a solution of 4.5 parts of azobiscyanovaleric acid and 4.3 parts of dimethylethanolamine in 45 parts of deionized water. Then a monomer mixture consisting of 65 parts of methyl methacrylate, 90 parts of n-butyl acrylate, 70 parts of styrene, 5 parts of 2-hydroxyethyl acrylate and 15 parts of ethylene glycol dimethacrylate and a solution of 5 parts of 2-acrylamide-2-methylpropanesulfonic acid and 1.9 parts of dimethylethanolamine in 30 parts of deionized water were added dropwise over 60 minutes. Then a solution of 1.5 parts of azobiscyanovaleric acid and 1.4 parts of dimethylethanolamine in 15 parts of deionized water was added. The mixture was stirred at 80° C. for 60 minutes to give an aqueous dispersion having a nonvolatile content of 38%, a pH of 7.2 and a particle diameter of 0.05 microns.

The aqueous phase of this dispersion was replaced with xylene using azeotropic distillation to give a dispersion in xylene having a microparticle content of 35%.

EXAMPLE 3

Microparticles Carrying Ligand Donor

A flask used in Example 1 was charged with 380 parts of deionized water, 50 parts of emulsifier prepared in Reference Example 2 and 7 parts of dimethylethanolamine at 80° C. The mixture was stirred to make a solution. To the solution were added a solution of 2.5 parts of azobiscyanovaleric acid and 1.6 parts of dimethylethanolamine in 50 parts of deionized water and a mixture consisting of 200 parts of styrene, 50 parts of ethylene glycol dimethacrylate and 12.5 parts of dibutyltin dilaurate dropwise over 90 minutes. The mixture was stirred for additional 90 minutes to give an aqueous dispersion having a nonvolatile content of 40.8% and a pH of 9.8.

The dispersion was spray dried to give microparticles having an average diameter of 3 microns.

EXAMPLE 4

Microparticles Carrying Dryer

The procedure of Example 3 was repeated except that 12.5 parts of cobalt naphthenate (20% in xylene) were substituted for dibutyltin dilaurate. An aqueous dispersion having a nonvolatile content of 40.1% and a pH of 7.8 was obtained.

The aqueous phase of this dispersion was replaced with xylene using azeotropic distillation to give a dispersion in xylene having a non-volatile content of 50%.

EXAMPLE 5

Microparticles Carrying Photosensitizer

The procedure of Example 3 was repeated except that 200 parts of methyl methacrylate and 25 parts of benzophenone were used in place of styrene and dibutyltin dilaurate, respectively. An aqueous dispersion having a nonvolatile content of 42.2% was obtained.

The aqueous phase of this dispersion was replaced with xylene using azeotropic distillation to give a dispersion in xylene having a nonvolatile content of 50%.

REFERENCE EXAMPLE 3

Photocurable Polymer System

To a flask equipped with stirring means were added 378 parts of epoxy resin (EPIKOTE 828, Shell Chemical Company), 2.6 parts of diethylaminoethyl methacrylate, 1 part of hydroquinone and 131 parts of cellosolve acetate. 144 parts of acrylic acid were added dropwise over about 2 hours at 120° C. and the mixture was stirred at the same temperature until an acid number less than 8 was reached.

EXAMPLE 6

Photocurable Coating Composition 100 parts of photocurable polymer prepared in Reference Example 3 were thoroughly mixed with 20 parts of trimethylpropane triacrylate and 20 parts of a dispersion of microparticles in xylene prepared in Example 5.

The resulting composition was applied on a degreased, polished mild steel plate of 0.6 mm thickness to a dry film thickness of 30 microns by means of a bar coater. The coating film was allowed to stand at room temperature for 2 hours to remove the solvent by evaporation and irradiated by a UV light under the conditions below to give a cured film having a pencil hardness of 3 H.

The irradiation was performed using a high pressure mercury lamp (Japan Storage Battery Co., Ltd., Model HI-20N, 80 w/cm, equipped with a reflector as a beam collector). The lamp was placed over a conveyer at a hight of 80 mm in a transverse position to the moving direction of the conveyer. Samples were moved beneath the lamp at a speed of 20 m/minutes.

REFERENCE EXAMPLE 4

Alkyd Varnish

A one liter flask equipped with stirring means, cooling means, a reflux condenser and a temperature controller was charged with 5 parts of xylene, 22.6 parts of phthalic anhydride, 1.5 parts of maleic anhydride, 51.9 parts of soybean fatty acid, 4.5 parts of pentaerythritol, 14.7 parts of glycerine, 10 parts of QUINTONE 1325(cyclopentadiene resin, Nippon Zeon Co., Ltd.) and 0.3 parts of triphenyl phosphate. The mixture was gradually heated with stirring requiring 30 minutes from room temperature to 150° C. and 1 hour from 150° C. to 250° C. The mixture was refluxed for additional 4 hours at 250° C. until an acid number of 5.0 was reached. The resulting condensate was diluted with mineral spirit to a resin concentration of 60%.

EXAMPLE 7

Oxidation Polymerizable Coating Composition 10 parts of microparticle dispersion prepared in Example 4 were uniformly blended with 100 parts of alkyd varnish prepared in Reference Example 4.

The resulting coating composition was applied on a glass plate to a dry film thickness of 30 microns and allowed to stand at room temperature for 5 hours to give a cured film having a pencil hardness of HB.

EXAMPLE 8

Polyisocyanate-containing Powder Coating Composition 80 parts of FINEDIC (polyester resin for powder coating, Dainippon Ink & Chemicals, Inc.), 17 parts of ADDUCT B-1530 (blocked polyisocyanate, Chemische Werke Hüls AG), 3 parts of EPIKOTE 1002 (bisphenol diglycidyl ether epoxy resin, Shell Chemical Company), 0.3 parts of ACRONAL 4 F acrylic oligomer, BASF), 43 parts of rutile type titanium dioxide and 5 parts of microparticles prepared in Example 3 were thoroughly mixed and classified to obtain a powder coating composition. The resulting composition was applied electrostatically on a steel plate of 0.6 mm thickness to a film thickness of 30 microns and baked at 230° C. for 10 minutes. The cured film exhibited a pencil hardness of H.

EXAMPLE 9

Heat-Curable Epoxy Coating Composition 50 parts of EPIKOTE 1001 (bisphenol A diglycidyl ether epoxy resin, Shell Chemical Company) were dissolved in 50 parts of cellosolve acetate and 50 parts of methyl ethyl ketone. To the solution was added 15 parts of CYMEL 303 (hexamethoxymethyl melamine, Mitsui Cyanamid Co., Ltd.) and 10 parts of microparticle dispersion prepared in Example 2.

The resulting composition was applied on a steel plate of 0.6 mm thickness to a dry film thickness of 20 microns using a bar coater and baked at 200° C. for 15 minutes to give a cured film having a pencil hardness of 2 H.

EXAMPLE 10

Heat-Curable Acrylic Emulsion Coating Composition

To 100 parts of PRIMAL AC-1533 (heat-curable acrylic emulsion, Rohm & Haas Co.) were added 15 parts of CYMEL 303 and 5 parts of aqueous dispersion of microparticles prepared in Example 1.

The resulting composition was applied on a glass plate to a dry film thickness of 20 microns using a bar coater and baked at 150° C. for 20 minutes to give a cured film having a pencil hardness of H.

EXAMPLE 11

Microparticles Carrying Ligand Donor

To a one liter flask having stirring means, cooling means and temperature control means were added 200 parts of deionized water. The flask was purged with $N_2$ gas with stirring and water was heated to 80° C.

To the flask were added dropwise a pre-emulsified mixture consisting of 190 parts of methyl methacrylate, 10 parts of 2-hydroxyethyl acrylate, 12 parts of dibutyltin laurate, 4 parts of QUARTAMIN 86 P (Kao Atlas Co., Ltd.), 3 parts of V-50 (water-soluble azo initiator, Wako Junyaku Co., Ltd.) and 200 parts of deionized water over 2 hours. The stirring was continued at 80° C. for 60 minutes to give an aqueous dispersion having a nonvolatile content of 33% and a particle diameter of 0.2 microns.

EXAMPLE 12

Cationic Electrodepositing Resins 1000 parts of EPIKOTE 1004 (bisphenol A diglycidyl ether epoxy resin, Shell Chemical Company) were dissolved in 300 parts of xylene with stirring at 100° C. The solution was cooled in an $N_2$ gas atmosphere. To the solution were added 78.2 parts of diethylamine and the mixture was again heated to 100° C. and maintained at the same temperature for 2 hours. After the addition of 188.1 parts of pelargonic acid, the mixture was reacted at 200° C. for 5 hours, purged with $N_2$ gas for 15 minutes and cooled to room temperature to give Component A.

A separate flask was charged with 174 parts of toluylenediisocyanate (80:20 mixture of 2,4- and 2,6-isomers). To this were added dropwise 118 parts of ethylene glycol monobutyl ether while maintaining the temperature below 50° C.

Then the product was reacted with 668 parts of glycerine/ethylene oxide/propylene oxide adduct (MW=2000, hydroxyl number 84) at 121° C. for 90 minutes until no isocyanate group was detected by an IR spectrophotometry. The reaction product was diluted with 411 parts of ethylene glycol monoethyl ether to give Component B.

EXAMPLE 13

Cationic Electrodepositing Coating Composition

A mixture of 500 parts of Component A and 285 parts of Component B obtained in Example 12 was neutralized with 19 parts of glacial acetic acid and then diluted with 1200 parts of deionized water 20 parts of aqueous dispersion prepared in Example 11 were mixed with the resulting composition to give a cationic electrodepositing coating composition.

A steel plate of 0.6 mm thickness pretreated with zinc phosphate was given an electrodeposition coating film to a dry film thickness of 20 microns using the above coating composition. The resulting film was baked at 180° C. for 30 minutes to give a cured film having a pencil hardness of H.

We claim:

1. A coating system comprising a film-forming polymer capable of curing through a selfcrosslinking reaction or a crosslinking reaction with a separate crosslinker and a catalytic amount of an agent for promoting the crosslinking reaction, wherein said agent is bound to polymeric microparticles having a diameter of 0.01 to 6 microns present in said system, and polymer microparticles being prepared by polymerizing a mixture of ethylenically unsaturated monomers, said agent being (i) an electron donating tertiary amine, present in a combination with an epoxy resin and an acid anhydride hardener, (ii) a metallic compound or a tertiary amine present in a combination with an active hydrogen atomcontaining polymer and a polyisocyanate, (iii) a dryer present in a polymer capable of curing through an oxidation polymerization reaction, (iv) an organic cobalt salt, an amine or a mercaptan present in an unsaturated polyester resin, or (v) a photosensitizer present in a photocurable resin.

2. The system according to claim 1 wherein at least a portion of said monomer mixture consists of a monomer having at least two polymerizable sites per molecule.

3. The system according to claim 1 wherein at least a portion of said monomer mixture consists of a combination of two monomers having mutually reactive groups.

4. The system according to claim 1 comprising an epoxy resin and an acid anhydride hardener, wherein said agent is an electron donating tertiary amine.

5. The system according to claim 1 comprising a polymer having active hydrogen atoms and a polyisocyanate, and wherein said agent is a metallic compound or a tertiary amine.

6. The system according to claim 1, comprising a polymer capable of curing through an oxidation polymerization reaction and wherein said agent is a dryer.

7. The system according to claim 1 comprising an unsaturated polyester resin and wherein said agent is an organic cobalt salt, an amine or a mercaptan.

8. The system according to claim 1 comprising a photocurable resin and wherein said agent is a photosensitizer.

9. The system according to claim 1 wherein said polymerization is carried out in the presence of an amphoionic substance.

10. The system according to claim 1 wherein said agent is bound to said polymeric microparticles by chemically introducing an ethylenic unsaturation function into the promoting agent molecule and copolymerizing the resulting promoting agent-containing monomer with said monomer mixture.

11. The system according to claim 1 wherein said agent is bound to said polymeric microparticles by incorporating the promoting agent into said monomer mixture and polmerizing the monomer mixture containing the promoter.

12. The system according to claim 1 wherein said agent is bound to said polymeric microparticles by impregnating the polymeric microparticles with a solution of said promoting agent.

* * * * *

UNITED STATES PATENT AND TRADEMARK OFFICE
CERTIFICATE OF CORRECTION

PATENT NO. : 4,777,213

DATED : October 11, 1988

INVENTOR(S) : Kanda et al

It is certified that error appears in the above-identified patent and that said Letters Patent is hereby corrected as shown below:

Title Page, Title:

Reads: "MICROPARTICLES HAVING CROSSLINKING REACTION PROMOTOR FUNCTION AND METHOD OF USE"

should Read: --MICROPARTICLES HAVING CROSSLINKING REACTION PROMOTER FUNCTION AND METHOD OF USE--

Signed and Sealed this

Twenty-eighth Day of February, 1989

*Attest:*

DONALD J. QUIGG

*Attesting Officer*     *Commissioner of Patents and Trademarks*